July 21, 1959
W. R. SIMONS
2,895,338
GYROSCOPE CAGING DEVICES
Filed March 5, 1956
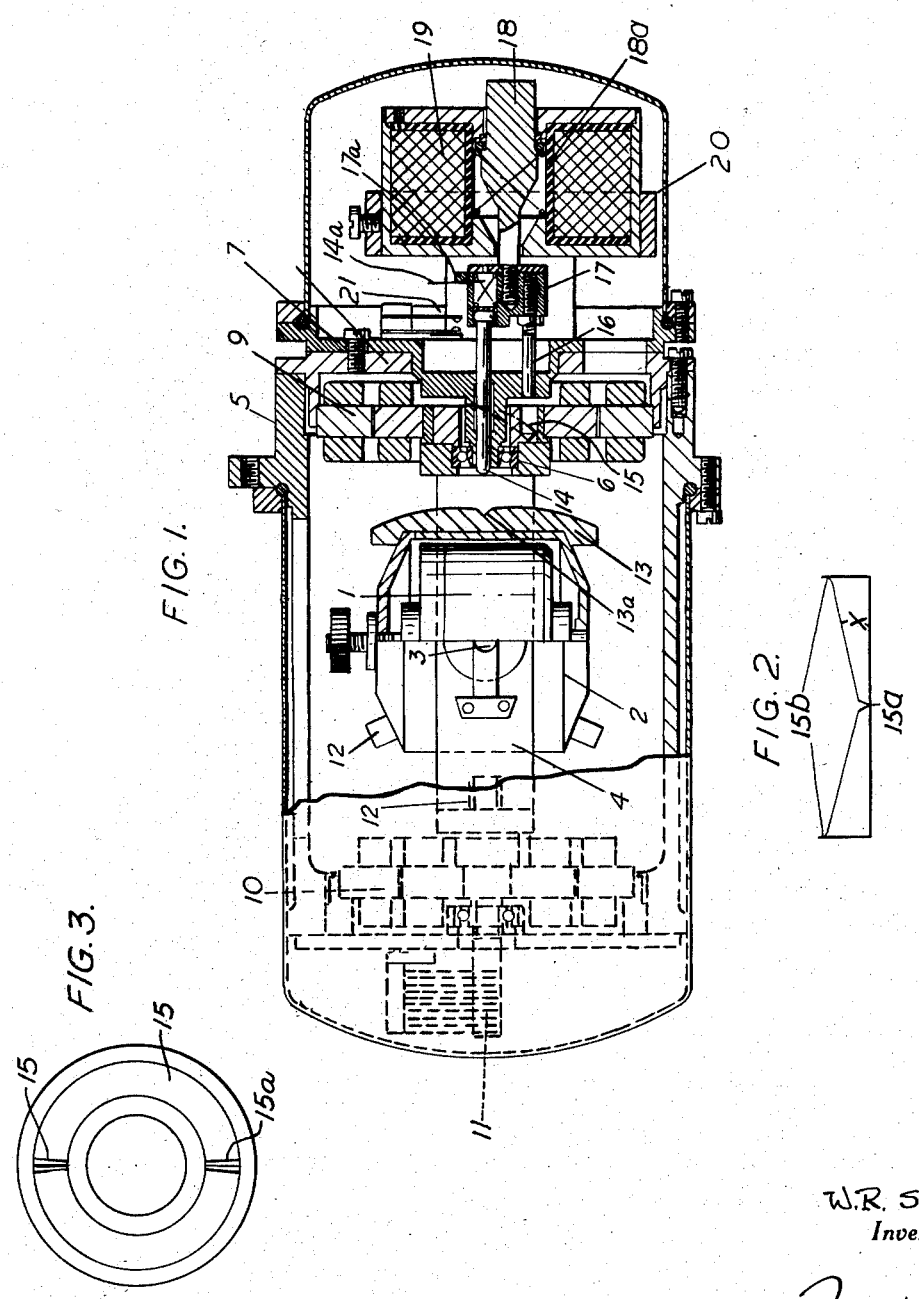
W.R. Simons
Inventor

United States Patent Office 2,895,338
Patented July 21, 1959

2,895,338

GYROSCOPE CAGING DEVICES

William R. Simons, Cheltenham, England, assignor to Smiths America Corp., Washington, D.C.

Application March 5, 1956, Serial No. 569,336

Claims priority, application Great Britain March 3, 1955

13 Claims. (Cl. 74—5.1)

The present invention relates to a caging device for a gyroscope having two precessional degrees of freedom.

The function of such a caging device is to bring the usual inner gimbal ring (or its equivalent, for example a rotor casing) into a predetermined position relative to the outer gimbal (usually one of orthogonality) and to bring the outer gimbal ring into a predetermined position relative to the structure to which it is (pivotally) attached.

It is the object of the present invention to provide a caging device which is simple and relatively compact.

According to the present invention a gyroscope caging device comprises a first cam member on the inner gimbal ring, said first cam member having a contour, in the plane passing through the outer gimbal axis normal to the inner gimbal axis, formed with an inwardly-directed depression, a first plunger whose line of action coincides with the outer gimbal axis, said first plunger being normally spaced away from the first cam member but being adapted to be forced into contact with the earlier-mentioned contour, the inner gimbal ring being located in the desired predetermined position relative to the outer gimbal ring when the plunger is at the vertex of the depression, a second cam member on the outer gimbal ring and surrounding the outer gimbal axis, a second plunger whose line of action is parallel to but displaced from the outer gimbal axis, said second plunger being adapted to be forced into contact with the contour of the second cam, the contour having a depression in the direction of the line of action of the second plunger, the outer gimbal ring being located in its desired predetermined position when the second plunger is at the vertex of the depression.

It will be appreciated by those skilled in the art that the lines of action of the first and second plungers must make angles with the tangents to the cam contours at the points of contact which are less than 90° minus the respective angles of friction. However, the shapes of the cams are preferably such that these angles are only slightly less than 90° minus the appropriate angles of friction.

Preferably the contours of the cam members are symmetrical about the line of action of the appropriate plungers when the plungers are at the vertices of the depressions.

It will be appreciated that the ideal shape for the first cam contour would comprise portions of two similar but opposite-handed equiangular spirals described about the intersection of the gimbal axes. In most practical cases, where the gyroscope is only required to be moved through a maximum angle of about 45° during caging about the inner gimbal axis, a sufficiently good approximation may be provided by two similar arcs of circles described about suitably offset centres, but for larger caging angles, up to the maximum of 90°, the approximation provided by such circular arcs is not satisfactory. Similarly the ideal shape for the contour of the second cam will comprise portions of two similar but opposite handed helices described about the outer gimbal axis.

A gyroscope having two precessional degrees of freedom and provided with a caging device in accordance with the present invention will now be described with reference to the accompanying drawings, of which:

Figure 1 shows a view of the instrument partially in section.

Figure 2 shows a developed view of the profile of one of the cams appearing in Figure 1.

Figure 3 shows an enlarged view in elevation of the same cam.

The gyroscope has an electrically-driven rotor 1 mounted inside a hollow casing 2, more or less cylindrical in form, which also constitutes the inner gimbal. Casing 2 is pivotally mounted by means of bearings 3 in an outer gimbal 4. Gimbal 4 is in turn mounted in a frame 5 by means of bearings 6 and plates 7 and 8 which are spigotted together. Various conventional devices such as a torque motor 9 (with stator attached to plate 8 and rotor attached to gimbal 4), a pick-off, mounted in a somewhat similar fashion indicated at 10 and a further pick-off (not shown) with its relatively moveable parts mounted respectively on the inner and outer gimbals are provided.

Gimbal 4 is capable of making complete rotation about its bearing axes, so slip rings, indicated at 11, are provided to enable electrical connection to be established to the gyro driving motor etc. Co-operating stops 12 on the inner and outer gimbals limit rotation about the inner gimbal, in the example shown, to an arc of about ±45°.

As so far described the gyroscope is quite conventional.

In accordance with the invention a cam plate 13 is attached to the rotor casing 2, its profile lying in the plane of the rotor spin axis and the outer gimbal axis. The profile is in the approximate form of parts of two similar equi-angular spirals having equations respectively of the form $$r = a \exp(m\,\theta)$$
$$r = a \exp(-m\,\theta)$$

$r$ being the distance of a point on the contour from the intersection of the gimbal axes, $a$ and $m$ being constants, $\theta$ being the angle between the radius vector from the intersection to the point and the outer gimbal axis when the gyro is in the caged position, the two parts of spirals meeting on the outer gimbal axis (as shown in Figure 1) when the gyro is caged. A small notch, 13a, is formed at that point. Bearing 6 is hollow, and a first plunger 14 extends through it, the line of action of the plunger 14 coinciding with the outer gimbal axis. The constant "$m$," mentioned above, is rather greater than the coefficient of friction between the end of plunger 14 and the profile of cam plate 13, so that the cam may slide relative to the plunger. A sufficiently close approximation to the spiral form can be obtained, for relatively small angles of up to about 45°, by giving the pofile the form of two arcs of circles with centres suitably offset from the inner gimbal axis. A second, channel form, cam 15 is attached to the outer gimbal ring 5, lying outside bearing 6 and in the general form of two similar portions of opposite-handed helices centred on the outer gimbal axes. Cam 15 may be engaged by a second plunger 16, moving parallel to the first plunger 14. A developed view of the profile of cam 15 is shown in Figure 2, the profile being seen to be in the general form of a pair of inclined straight lines, with a depression 15a, at the innermost junction of the straight lines and on upstanding resilient part, 15b, at the outermost. The angle between these lines and the line of action of plunger 16 is rather less than 90° minus the angle of friction between them, that is to say, the tangent of the angle "x" in Figure 2 is rather greater than the coefficient of friction. Cam 15 is so located that when plunger 16 is seated in depression 15a the gyroscope is caged in the desired position about the outer gimbal axis. Plungers 14 and 16 are located by guide holes in plate 7. Both plungers are mounted upon a carrier 17 positioned by the plunger 18 of a solenoid 19. Plunger 14 is loaded by a spring indicated at 14a, but plunger 16 is slidably attached to carrier 17. Plunger 18 is loaded by means of a spring indicated at 18a. An insulated projection 17a on carrier 17 closes a pair of contacts 21 when the plunger 18 approaches its fully protruded position. Solenoid 19 is carried on an adjustable mounting, rigidly attached to plate 7.

In the normal operating condition solenoid 19 is de-energised so that plungers 14 and 16 are respectively clear of the corresponding cams 13 and 15.

To cage the gyroscope solenoid 19 is energised, whereupon the plungers engage with the corresponding cams and the gyroscope is brought to a position in which the plungers are seated in the depressions. If the rotor is not spinning, the plunger tips slide over the respective cams in an obvious manner. If the rotor is spinning, and the gyroscope is displaced away from the caged position about both axes, upon energisation of the solenoid the plungers make contact with their respective cams. The gyroscope then precesses until plunger 16 seats in depression 15a and subsequently plunger 14 is seated in depression 13a under the loading of spring 14a. Upon completion of caging, or rather just prior to such completion, contacts 21 are closed, their closure being utilised to initiate operation of an indicating or warning device.

The function of the upstanding resilient part 15b of the profile of cam 15 is to ensure that if the gyroscope is exactly 180° away from its caged position plunger 16 engages with one or other of the sloping parts of the cam profile, and does not stop in a dead-centre position.

Conveniently plate 7 may be made rotatable about the outer gimbal axis, so that the gyroscope, when in its caged condition, may be set in any desired position about that axis.

I claim:

1. A caging device for a gyroscope having an inner gimbal ring pivotally mounted in an outer gimbal ring for rotation about an inner gimbal axis, which said outer gimbal ring is itself mounted for rotation about an outer gimbal axis comprising a first cam member on the inner gimbal ring, said first cam member having an operative portion lying in the plane passing through the outer gimbal axis normal to the inner gimbal axis, and being formed with an inwardly-directed depression, a first plunger whose line of action coincides with the outer gimbal axis, said first plunger being normally spaced away from the operative portion of the first cam member but being adapted to be forced into contact with the operative portion, the operative portion then moving past the plunger solely by reason of the force exerted by the plunger in the direction of the outer gimbal axis, the inner gimbal ring being located in the desired caged position relative to the outer gimbal ring when the plunger is at the vertex of the depression, a second cam member on the outer gimbal ring having an operative contour surrounding the outer gimbal axis, a second plunger whose line of action is parallel to but displaced from the outer gimbal axis, said second plunger being adapted to be forced into contact with the contour of the second cam, the contour having a depression in the direction of the line of action of the second plunger, the outer gimbal ring being located in its desired predetermined position when the second plunger is at the vertex of the depression.

2. A device as claimed in claim 1 wherein the lines of action of the first and second plungers make angles with the respective cam contours at the points of contact which are slightly less than 90° minus the respective angles of friction.

3. A device as claimed in claim 2 wherein the operative portions of the cam members are symmetrical about the lines of action of the appropriate plungers when the plungers are at the vertices of the depressions.

4. A device as claimed in claim 3 wherein the operative portion of the first cam comprises substantially portions of two similar but opposite-handed equi-angular spirals described about the intersection of the gimbal axes.

5. A device as claimed in claim 3 for use in conjunction with a gyroscope required to be moved through a maximum angle of about ±45° during caging, wherein the operative portion of the first cam comprises two axes of circles described about centres offset from the inner gimbal axis.

6. A device as claimed in claim 3 wherein the operative contour of the second cam comprises portions of two similar but opposite-handed helices described about the outer gimbal axis.

7. A device as claimed in claim 6 wherein the contour of the second cam has an upstanding resilient part spaced 180° away from the notch formed therein.

8. A device as claimed in claim 2 wherein the plungers are mounted upon a carrier moveable in the direction of the outer gimbal axis.

9. A device as claimed in claim 8 wherein the first plunger is spring-mounted on the carrier.

10. A device as claimed in claim 8 wherein the carrier may be rotated about the outer gimbal axis.

11. A device as claimed in claim 8 wherein the carrier is actuated by a solenoid.

12. A device as claimed in claim 8 wherein means are provided to indicate when the carrier is in a position corresponding to a caged condition of the gyroscope.

13. A caging device for a gyroscope having an inner gimbal ring pivotally mounted in an outer gimbal ring for rotation about an inner gimbal axis, which said outer gimbal ring is itself pivotally mounted for rotation about an outer gimbal axis, a cam member on the inner gimbal ring, said cam member having an operative portion lying in the plane passing through the outer gimbal axis normal to the inner gimbal axis and being formed with an inwardly-directed depression, a plunger whose line of action coincides with the outer gimbal axis, said plunger being normally spaced away from the operative portion of the first cam member, but being adapted to be forced into contact with the operative portion, the operative portion then moving past the plunger solely by reason of the force exerted by the plunger in the direction of the outer gimbal axis, the inner gimbal ring being located in the desired caged position relative to the outer gimbal ring when the plunger is at the vertex of the depression, and means to cage the outer gimbal ring about the outer gimbal axis.

References Cited in the file of this patent
UNITED STATES PATENTS

| | | |
|---|---|---|
| 2,441,157 | Kissel | May 11, 1948 |
| 2,491,813 | Jordan | Dec. 20, 1949 |
| 2,694,314 | Konet et al. | Nov. 16, 1954 |
| 2,716,344 | Serfreid | Aug. 30, 1955 |
| 2,729,978 | Judson | Jan. 10, 1956 |
| 2,786,356 | Klose | Mar. 26, 1957 |
| 2,808,726 | Chombord | Oct. 8, 1957 |